(12) United States Patent
Dobinson et al.

(10) Patent No.: US 10,621,524 B2
(45) Date of Patent: Apr. 14, 2020

(54) EXPORTING HIERARCHICAL DATA FROM A SOURCE CODE MANAGEMENT (SCM) SYSTEM TO A PRODUCT LIFECYCLE MANAGEMENT (PLM) SYSTEM

(71) Applicant: Dassault Systemes Americas Corp., Waltham, MA (US)

(72) Inventors: Ian Dobinson, Thatcham (GB); Peter Haynes, Costa Mesa, CA (US)

(73) Assignee: Dassault Systemes Americas Corp., Waltham, MA (US)

( * ) Notice: Subject to any disclaimer, the term of this patent is extended or adjusted under 35 U.S.C. 154(b) by 785 days.

(21) Appl. No.: 14/935,789

(22) Filed: Nov. 9, 2015

(65) Prior Publication Data
US 2017/0132556 A1    May 11, 2017

(51) Int. Cl.
*G06Q 10/06* (2012.01)
*G06F 16/25* (2019.01)

(52) U.S. Cl.
CPC ..... *G06Q 10/063114* (2013.01); *G06F 16/25* (2019.01); *G06Q 10/0637* (2013.01)

(58) Field of Classification Search
None
See application file for complete search history.

(56) References Cited

U.S. PATENT DOCUMENTS

| | | |
|---|---|---|
| 5,608,879 A | 3/1997 | Cooke |
| 6,457,003 B1 | 9/2002 | Gajda |
| 7,003,587 B1 | 2/2006 | Battat |
| 7,555,527 B1 | 6/2009 | Slaughter et al. |
| 7,801,945 B1 | 9/2010 | Geddes et al. |
| 7,809,762 B1 | 10/2010 | Parker |
| 9,904,721 B1 | 2/2018 | Holenstein |
| 10,140,350 B2 | 11/2018 | Dobinson |
| 2002/0023091 A1 | 2/2002 | Silberberg |
| 2003/0225742 A1 | 12/2003 | Tenner |
| 2006/0161597 A1 | 7/2006 | Ougarov |

(Continued)

OTHER PUBLICATIONS

Ali Muhammad et al, Combined application of Product Lifecycle and Software Configuration Management systems for ITER remote handling (Year: 2009).*

(Continued)

*Primary Examiner* — Kurtis Gills
*Assistant Examiner* — Akosua Kyereme-Tuah
(74) *Attorney, Agent, or Firm* — Hamilton, Brook, Smith & Reynolds, P.C.

(57) ABSTRACT

Traditionally, PLM systems and SCM systems have not been linked. In an embodiment, a computer method includes, responsive to a user request to transfer a module from a source code management (SCM) system to a product lifecycle management (PLM) system, extracting, from a processor at the SCM system, data representing modules, versions of the modules, and hierarchical relationships of the modules from a data source of the SCM system. The method further includes creating a PLM system module having the extracted data representing the modules, versions of the modules, and the hierarchical relationships of the modules. Therefore, the SCM system can export a module to the PLM system in a process controlled at the SCM system.

20 Claims, 9 Drawing Sheets

(56) References Cited

U.S. PATENT DOCUMENTS

| | | | |
|---|---|---|---|
| 2006/0174190 A1* | 8/2006 | Gomes | G06Q 10/10 715/229 |
| 2008/0071844 A1* | 3/2008 | Gopal | G06F 16/254 |
| 2008/0155212 A1 | 6/2008 | Stock | |
| 2009/0063547 A1 | 3/2009 | Wright et al. | |
| 2010/0042506 A1 | 2/2010 | Ravenel | |
| 2011/0282836 A1 | 11/2011 | Erickson | |
| 2012/0030015 A1 | 2/2012 | Brunsman et al. | |
| 2012/0036370 A1 | 2/2012 | Lim et al. | |
| 2012/0143825 A1 | 6/2012 | Boehm | |
| 2012/0233418 A1 | 9/2012 | Barton | |
| 2013/0116984 A1* | 5/2013 | Montana | G06T 17/00 703/1 |
| 2014/0213304 A1 | 7/2014 | Beckett et al. | |
| 2015/0293947 A1 | 10/2015 | Bhagavan et al. | |
| 2016/0088080 A1 | 3/2016 | Bare, II et al. | |
| 2017/0132303 A1 | 5/2017 | Dobinson | |
| 2017/0132543 A1 | 5/2017 | Dobinson | |
| 2017/0235605 A1* | 8/2017 | Chaloupka | G06F 9/4881 718/103 |

OTHER PUBLICATIONS

Do et al, A Product Data Management architecture for integrating hardware and software development (Year: 2011).*

Dassault Systemes, DS ENOVIA, ENOVIA V6R2013X; ENOVIA Factsheet http://www.3ds.com/fileadmin/PRODUCTS-SERVICES/ENOVIA/PDF/ENOVIA-V6R2013x-factsheet.pdf retrieved from Internet Feb. 24, 2016.

Concurrent Versions Systems, Wikipedia https://en.wikipedia.org/wiki/Concurrent_Versions_System retrieved from Internet Feb. 24, 2016.

Git (software)—Wikipedia https://en.wikipedia.org/wiki/Git_(software) retrieved from Internet Feb. 24, 2016.

http://svn.apache.org/repos/asf/subversion/tags/1.9.2/CHANGES retrieved from Internet Feb. 24, 2016.

Perforce Powers Development of Legacy Quest for iOS and Andriod https://www.perforce.com/press/perforce-powers-development-legacy-quest-ios-android retrieved from Internet Feb. 24, 2016.

EP Search Report for Application No. EP 16 19 7621 dated Mar. 31, 2017 entitled "Virtual Clay Modeling Haptic Device".

Muhammad, A., et al. "Combined Application of Product Lifecycle and Software Configuration Management Systems for ITER Remote Handling" Fusion and Design, vol. 84, No. 7-11 pp. 1367-1371, Jun. 1, 2009.

EP Search Report for Application No. 16 19 7619 dated Mar. 23, 2017 entitled "Exporting Hierarchical Data From a Product Lifecycle Management (PLM) System to a Source Code Management (SCM) System".

Do., N., et al., "A Product Data Management Architecture for Integrating Hardware and Software Development", Computers in Industry, vol. 62, No. 8, Sep. 6, 2011.

Crnkovic, et al, "Implementing and Integrating Product Data Management and Software Configuration Management", Aug. 4, 2003. retrieved from Internet: http://fileadmin.cs.lth.se/pdm-scm/6-Figures.ppt.

EP Search Report for Application No. 16 19 7618 dated Mar. 14, 2017 entitled "Exporting Hierarchical Data From a Source Code Management (SCM) System to a Product Lifecycle Management (PLM) System".

Final Office Action for U.S. Appl. No. 14/935,844 "Exporting Hierarchical Data From a Product Lifecycle Management (PLM) System to a Source Code Management (SCM) System" dated Mar. 21, 2019.

Non-Final Office Action dated Jun. 27, 2019 for U.S. Appl. No. 14/935,844.

Final Office Action for U.S. Appl. No. 14/935,844 dated Nov. 7, 2019.

Notice of Allowance for Application No. 14/935,844 dated Feb. 25, 2020.

* cited by examiner

EXPORTING HIERARCHICAL DATA FROM A SOURCE CODE MANAGEMENT (SCM) SYSTEM TO A PRODUCT LIFECYCLE MANAGEMENT (PLM) SYSTEM

RELATED APPLICATIONS

This application is related to co-filed U.S. Applications "Exporting Hierarchical Data From A Product Lifecycle Management (PLM) System To A Source Code Management (SCM) System" by Ian Dobinson and Peter Haynes, being assigned to a common assignee, and filed on the same day as the present Application, and "Bi-Directional Synchronization Of Data Between A Product Lifecycle Management (PLM) System And A Source Code Management (SCM) System" by Ian Dobinson and Peter Haynes, being assigned to a common assignee, and filed on the same day as the present Application.

The entire teachings of the above applications are incorporated herein by reference.

BACKGROUND

Hardware developers, and particularly in the integrated circuit design community, commonly apply a hierarchical development approach to design, where a high-level product references, or is built out of, sub-products. Similarly, software developers commonly use a hierarchy, with higher level software components making use of reusable software blocks.

A Source Code Management (SCM) system provides, at its most basic level, a means to version control a set of data files stored in a memory or database, which allows tracking changes to those files over time. Examples of SCM systems are:

a) The DesignSync® system, which is part of Dassault Systemes' Defect Management and Collaboration product;
b) The publicly available Concurrent Versioning System (CVS);
c) The publicly available GIT revision control system; and
d) The Subversion and Perforce systems available with commercial support.

A hierarchical SCM system is one where the data files can be managed as packages or modules, which may contain large numbers of individual files. The modules further or packages can reference other modules or packages to form a hierarchy of data.

A Product Lifecycle Management (PLM) system provides processes for managing the entire lifecycle of a product from inception, engineering design, manufacture, to service and disposal of the manufactured products. The PLM system integrates people, data, processes and business systems and provides a product information backbone for companies and their extended enterprise. The PLM system represents data as a series of objects connected by relationships. For example, a first object may represent a product under development, which has a relationship to a second object representing the organization which is developing the product. These objects may also support revisions (or versions) representing different releases of the objects, or representing the development state of the object (for example, different revisions might represent a version 1.0 of a chip or a later 2.0 version of the chip, or might also represent the work that is in progress towards a future release). These objects may also support hierarchy via relationships between objects of the same or similar types. For example, the objects representing a chip may have a relationship to an object representing the CPU module that is part of that chip. The applications provided by Dassault Systemes under the banner of the 3DExperience® Platform provide an example of a PLM system.

SUMMARY

In an embodiment of the present invention, a system and method provides a scheme for passing a description of a hierarchical set of data blocks from an SCM system to a PLM system. In an embodiment of the present invention, a system and method transfers data from a PLM system to a SCM system that supports hierarchical design. In an embodiment of the present invention, a system and method invention manually or automatically passes a description of a hierarchical set of data blocks from the PLM system to the SCM system or from the SCM system to the PLM system.

Traditionally, PLM systems and SCM systems have not been linked. At least some known solutions provide ways to link the data in the two systems, and provide limited support for pulling data from the SCM system into the PLM system. However, the previous manner is not efficient, limited in functionality, and does not allow for the flow to be controlled from the SCM system, allow for the data structure to be defined in the PLM system and then pushed down to the SCM system, or automatically update data in one system as corresponding data is modified in the other system, as in embodiments of the present invention.

SCM to PLM

An embodiment of the present invention describes a means for transferring data from a SCM system that supports hierarchical design to a PLM or similar system. Passing the data includes extracting the data from the SCM system and converting the data into a portable format, including the hierarchical connections and details of whether those connections are specific releases of sub-blocks or versions that are under development.

The system further customizes that data, so that an individual implementation of the system can provide data needed by the targeted PLM system's objects. The system then transfers that data to the PLM system.

The system creates the objects in the PLM system that represent the blocks of data from the SCM system, and their versions, and the hierarchical connections between them.

The system further customizes the types of data that are created in the PLM system, the relationships used to connect them, and the objects in the PLM system based on additional data passed across via the customization functionality on the SCM system.

The system then passes information on the objects that have been created, which are equivalent to the SCM data objects, back to the SCM system so that this information can be stored for tracking purposes.

In an embodiment, of the present invention creates new data in the PLM system from data in the SCM system.

An embodiment of the present invention provides initialization and control of the data transfer from the SCM system. This allows advanced customization and control capabilities. The system further provides a scheme for storing tracking information on the SCM system.

The SCM system manages the data that defines the system level objects and their hierarchical relationships. Therefore, it is advantageous for the data to be inserted into the PLM system from the SCM system at the time it is created in the SCM system. Existing solutions do not provide a means to directly create data within the PLM system using a process controlled from the SCM system, as in embodiments of the present invention.

Different PLM systems hold different kinds of information (e.g., properties/attributes) for the individual objects, and different SCM systems, or different implementations of a specific SCM system. The PLM system have access to different sets of data that can be used to fill in the information in the PLM system. Therefore, in an embodiment of the present invention, the system can aggregate, generate and supply this additional information when transferring data from the SCM system to the PLM system. Existing solutions further do not support detailed customization of creating the data and setting of associated attributes.

Once data has been transferred to the PLM system, the SCM retains a link to the created objects. The links from the SCM system to the PLM system can enable advanced functionality by allowing the SCM system to link directly to equivalent objects in the PLM system. For example, the SCM system can implement a function to directly display the equivalent PLM system object if the SCM system knows what that object is. Existing solutions do not provide for the storage of this tracking (e.g., breadcrumb) information within the SCM system.

PLM to SCM

An embodiment of the present invention is a scheme for passing a description of a hierarchical set of data blocks from the PLM system to the SCM system. Passing the description includes extracting the data from the PLM system into a portable format, including the hierarchical connections and details of whether those connections are to specific releases of sub-blocks or to versions that are under development. The system further customizes that data, so that an individual implementation of the system can provide data that can be used by the targeted SCM system. The system further transfers that data to the SCM system. The system further creates the container objects in the SCM system that represent the objects from the SCM system, and the hierarchical connections between them. The system further customizes the objects in the SCM system based on additional data passed across via the customization functionality on the PLM system. The system further passes back to the PLM system information on the objects that have been created, which are equivalent to the PLM data objects, so that this information can be stored for tracking purposes.

The data in the PLM system is used for many operations, for example, to track the development status of the pieces comprising a product and to track issues (e.g., defects, bugs) found against any of the pieces comprising a product.

In many cases, rolled up data is employed to get an overall status of the product. For example, a product such as a computer chip might be made up of multiple components, such as a Random Access Memory (RAM) and a Central Processing Unit (CPU). If an issue is found against the CPU and a corresponding defect raised, then the manager of the chip desires a rolled-up report indicating that this defect exists in some sub-component and thus impacts the chip: The data in the PLM system, and especially the hierarchical connection/usage of sub-blocks by a higher level product, is therefore accurately tracked in the system.

The PLM system can be considered the master for defining the blocks of the design and the hierarchical relationships between them. That is, the structure of the design is created in the PLM system and the SCM system is used to manage the individual data files for the blocks comprising the structure. The SCM system contains its own objects to represent the blocks of the design, and the hierarchical relationships between them, so that the users of the SCM system can fetch the correct sets of data comprising the design and perform their operations on that data.

An embodiment of the present invention provides the capability to create the blocks and the connections between them within the SCM system using the definition that has been put together in the PLM system. Existing solutions do not provide a means to directly create data within the SCM system using a process controlled from the PLM system.

Different PLM systems store different kinds of information (e.g., properties, attributes) for individual objects, and different SCM systems may store different sets of data defined from the information in the PLM system. In an embodiment of the present invention, transferring data from the PLM system to the SCM system is flexible enough to handle this additional information. Existing solutions do not support detailed customization of the process of creation of the data and setting of associated attributes.

Once data is transferred to the SCM system, the PLM system retains a link to the created objects and the SCM system maintains knowledge of the equivalent source object in the PLM system. This enables advanced functionality by allowing the SCM system to link directly to equivalent objects in the PLM system. For example, the SCM system can implement a function to directly display the equivalent PLM system object if the SCM system knows what that object is. Existing solutions do not provide for the storage of this tracking (or breadcrumb) information within the SCM system. An embodiment of the present invention creates new data in the SCM system from data in the PLM system.

An embodiment of the present invention improves the previous available solutions by:
 a) Allowing initialization and control of the data transfer from the PLM system;
 b) Allowing new container objects (e.g., modules in the DesignSync system) or new branches of existing objects to be created in the SCM system based on the PLM system information;
 c) Providing advanced customization and control capabilities; and
 d) Providing a scheme for storing tracking information on the SCM and PLM systems.

Automatic Updates from PLM to SCM or Automatic Updates from SCM to PLM

An embodiment of the present invention manually or automatically passes a description of a hierarchical set of data blocks from the PLM system to the SCM system, or from the SCM system to the PLM system. The system passes the descriptions by employing the above described systems to extract the data on one system and transfer that data to the other system. The system further provides extensions to the previously described systems to allow for an incremental update of the data on the target system. The extensions to the above described systems further allow the users to manually initiate an update starting with the data on one side. The system further automatically identifies changes and synchronizes them between the two systems.

In an embodiment, the present invention allows for ongoing development of the hierarchical data on either the PLM or SCM system and continued synchronization of that data. In an embodiment, the present invention further allows for the data to be automatically synchronized, thus preventing any issues due to out-of-date information being present in either system.

In an embodiment, a system transfers data from a PLM system to a SCM system that supports hierarchical design, and vice-versa. In these embodiments, the transfer is initiated by the user, and is intended for an initial push of data between the systems. The system updates the data on both systems and synchronizes the data, either manually or automatically.

A hierarchical SCM system allows the data files to be managed as packages or modules, which can contain large numbers of individual files. Those modules can reference other modules to form a hierarchy of data.

The SCM system stores its own objects representing the blocks of the design and the hierarchical relationships between them so that the users of the SCM system can fetch the correct sets of data comprising the design and perform operations on that data.

Over time, the definition of the structure may change in many ways. For example, the architect of the product, using the PLM system, may decide to employ on additional block or an alternative IP Block (e.g., a module, design segment, or piece of intellectual property (IP)) typically provided by some other group in the design. As another example, the developer of the product, using the SCM system, may decide that a block is split into two parts for implementation purposes. As yet another example, a team developing one of the sub-blocks of the design may release a new version of that block and may decide to employ the new version in the parent product.

The changes can be performed at any time during development and can be initiated from either the PLM system or the SCM system when using an embodiment of the present invention. If changes are made to the structure on only one of the systems, then challenges may arise. For example, a change made in the PLM system and not the SCM system can result in the wrong product being built with disastrous impact on product reliability or functionality. As another example, a change made in the SCM system and not the PLM system can result in incorrect tracking of issues, or of IP usage. This can cause IP licensing issues or lack of accurate tracking of problems, possibly resulting in product reliability issues (products shipped without knowledge of existing bugs.)

The existing solutions do not provide a means to incrementally update the data in one system from the source definition in the other, either manually or automatically.

In an embodiment, a computer method includes, responsive to a user request to transfer a module from a source code management (SCM) system to a product lifecycle management (PLM) system, extracting, from a processor at the SCM system, data representing modules, versions of the modules, and hierarchical relationships of the modules from a data source of the SCM system. The method further includes creating the PLM system module having the extracted data representing the modules, versions of the modules, and the hierarchical relationships of the modules.

In an embodiment, the method further includes customizing the extracted data to match data module requirements of the PLM system by retrieving additional information needed to create a PLM system module matching the data module requirements. Creating the PLM system module can employ the customized extracted data.

In an embodiment, the method further includes mapping an identity of the SCM system to a corresponding identity of the PLM system. The identity of the SCM system and the corresponding identity of the PLM system can be distinct identifiers and also representing the same user entity.

In an embodiment, the method further includes providing a breadcrumb in the created SCM system module having a link to the module of the PLM system. The method may also include, responsive to an update request, comparing a version of the created PLM system module to a version of the linked module of the SCM system by accessing the breadcrumb. If the module of the SCM system is a newer version, updating the PLM system module to the newer version of the module of the SCM system.

In an embodiment, creating the PLM system module includes creating a plurality of PLM system modules corresponding to the hierarchical relationships of the modules from a data source of the SCM system.

In an embodiment, a computer system includes a processor and a memory with computer code instructions stored therein. The memory is operatively coupled to said processor such that the computer code instructions configure the processor to implement an extraction module configured to, responsive to a user request to transfer a module from a source code management (SCM) system to a product lifecycle management (PLM) system, extract, from a processor at the SCM system, data representing modules, versions of the modules, and hierarchical relationships of the modules from a data source of the SCM system. The computer codes instructions further configure the processor to implement a creation module configured to create the PLM system module having the extracted data representing the modules, versions of the modules, and the hierarchical relationships of the modules.

In an embodiment, the system also includes a customization module configured to customize the extracted data to match data module requirements of the PLM system by retrieving additional information needed to create a PLM system module matching the data module requirements. Creating the PLM system module can employ the customized extracted data.

In an embodiment, the computer system can also include a mapping module configured to map an identity of the SCM system to a corresponding identity of the PLM system. The identity of the SCM system and the corresponding identity of the PLM system can be distinct identifiers and also representing the same user entity.

In an embodiment, the computer system further includes a breadcrumb module configured to provide a breadcrumb in the created SCM system module having a link to the module of the PLMsystem. The system may further include a comparison module configured to, responsive to an update request, compare a version of the created PLM system module to a version of the linked module of the SCM system by accessing the breadcrumb. If the module of the SCM system is a newer version, the comparison module updates the PLM system module to the newer version of the module of the SCM system.

In an embodiment, creating the PLM system module includes creating a plurality of PLM system modules corresponding to the hierarchical relationships of the modules from a data source of the SCM system.

In an embodiment, a non-transitory computer-readable medium configured to store instructions for creating a product lifecycle management (PLM) module. The instructions, when loaded and executed by a processor, cause the processor to, responsive to a user request to transfer a module from a source code management (SCM) system to a product lifecycle management (PLM) system, extract, from a processor at the SCM system, data representing modules, versions of the modules, and hierarchical relationships of the modules from a data source of the SCM system. The instructions further cause the processor to create the PLM system module having the extracted data representing the modules, versions of the modules, and the hierarchical relationships of the modules.

In an embodiment, the instructions further cause the processor to customize the extracted data to match data module requirements of the PLM system by retrieving additional information needed to create a PLM system module matching the data module requirements. Creating the PLM system module can employ the customized extracted data.

In an embodiment, the instructions further cause the processor to map an identity of the SCM system to a corresponding identity of the PLM system. The identity of the SCM system and the corresponding identity of the PLM system can be distinct identifiers and also representing the same user entity.

In an embodiment, the instructions further cause the processor to provide a breadcrumb in the created SCMsystem module having a link to the module of the PLMsystem. The instructions further cause the processor to, responsive to an update request, compare a version of the created PLM system module to a version of the linked module of the SCM system by accessing the breadcrumb. If the module of the SCM system is a newer version, the instructions update the PLM system module to the newer version of the module of the SCM system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
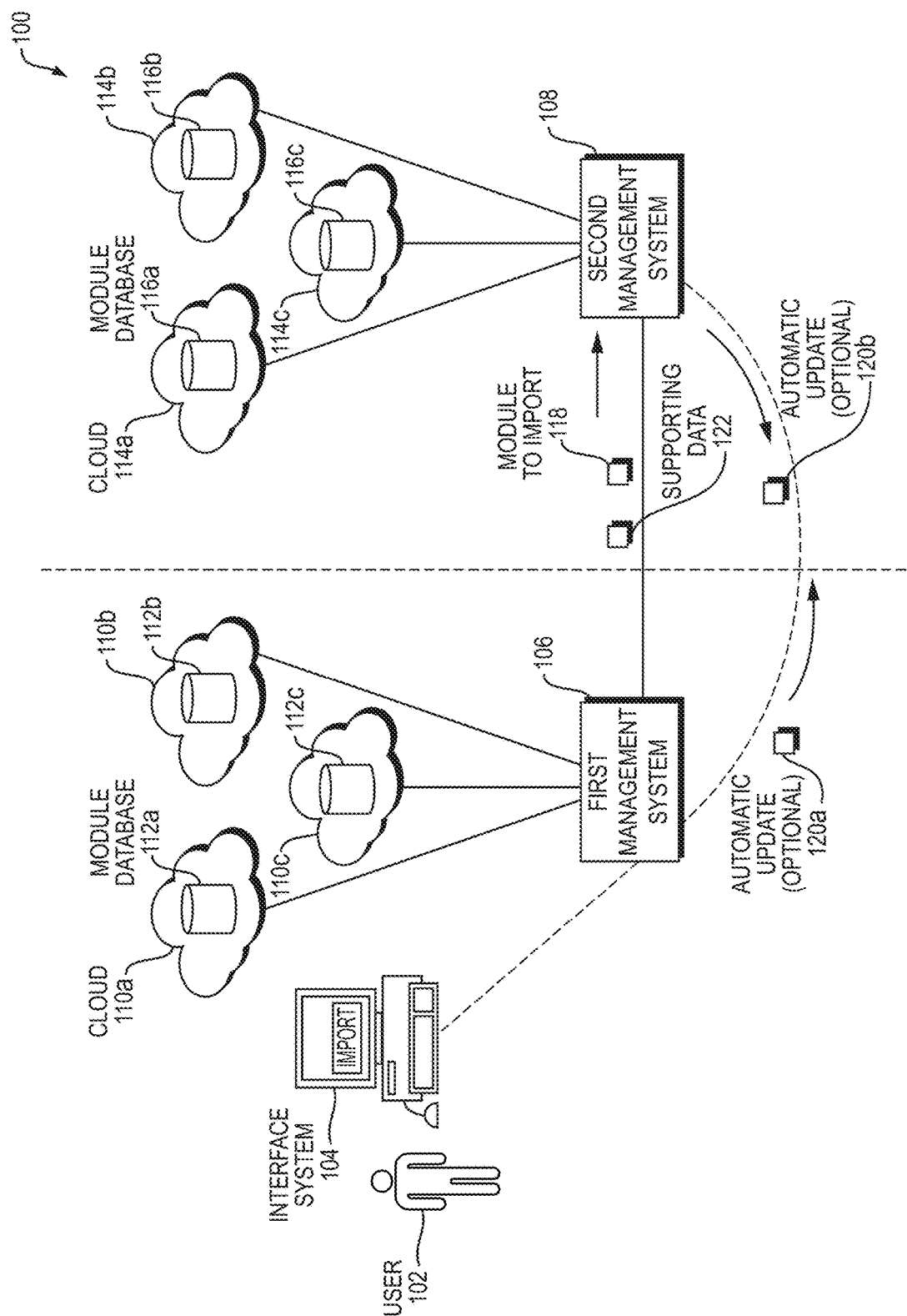
FIG. 1 is a block diagram illustrating an exemplary embodiment of the present invention.

FIG. 1 is a block diagram 100 illustrating an exemplary embodiment of the present invention. A user 102 employs an interface system 104 coupled with a first management system 106 and second management system 108. Examples of the first and second management systems 106 and 108, respectively, can be either a SCM or a PLM. Both the SCM and PLM employ a hierarchical collection of modules to form a source code solution, in the case of the SCM, or a product, in the case of a PLM. In many situations, a product in a PLM, such as a chip, may need source code in its design, and a source code design may need hardware resources. Therefore, a system for importing modules from the first management system 106 to the second management system 108 can be desirable.

The first management system 106 and second management system 108 are coupled with respective module databases 112a-c and 116a-c that can be stored, optionally, in respective cloud network(s) 110a-c and 114a-c. In embodiments, the module databases 112a-c and 116a-c can also be stored locally (not shown), or on a single remote server (not shown), or multiple remote servers (not shown). The user 102, via an interface system 104, directs a module to import 118 to be sent from the first management system 106 to the second management system 108. The first management system 106 further sends supporting data 122 to the second management system 108. The supporting data 122 can include hierarchy information about the module 118, supporting modules, and breadcrumb information regarding the modules.

Further, the first management system 106 and second management system 108 can, in one embodiment, send respective automatic updates 120a-b to each other. The automatic updates 120a-b are sent upon an imported module being modified on one system such that updates are required on the other system. Automatic updates 120a-b are described in further detail below.

Figure 2:
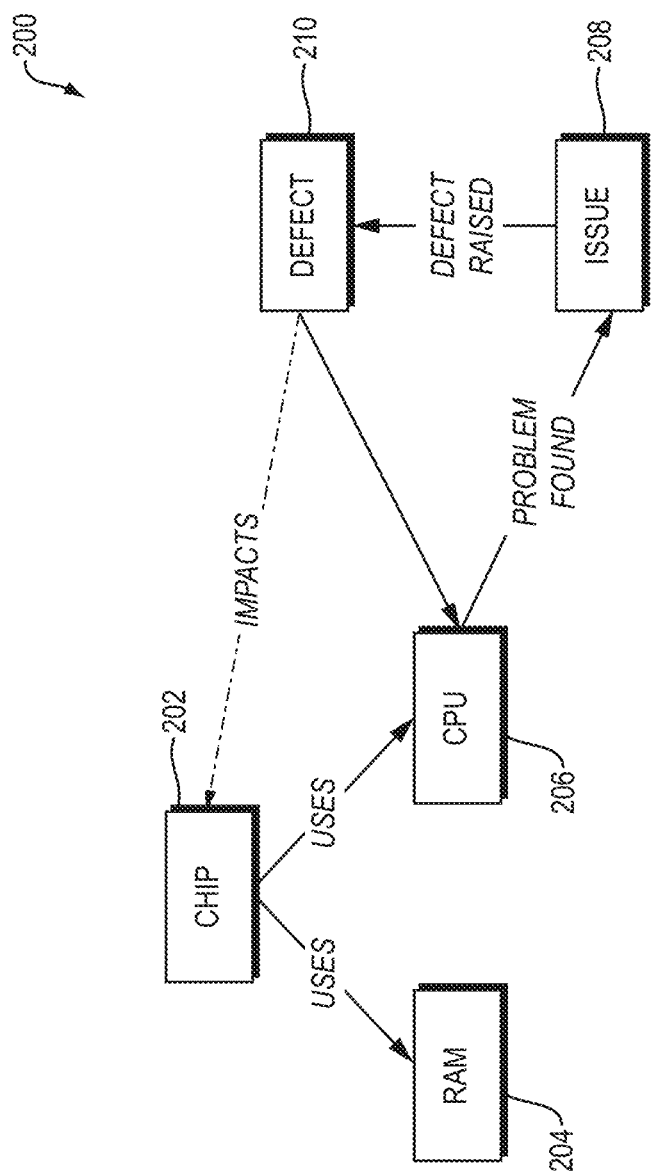
FIG. 2 is a block diagram illustrating an example embodiment of a hierarchy in a PLM system.

FIG. 2 is a block diagram 200 illustrating an example embodiment of a hierarchy in a PLM system. The example hierarchy includes a chip 202, which is related to both a random access memory (RAM) 204 and a central processing unit (CPU) 206. The chip 202 has a "uses" relationship with both the RAM 204 and the CPU 206, indicating that the RAM 204 and CPU 206 are sub-components of the chip 202.

The data in the PLM system is used for operations, for example, tracking development status of the pieces that make up a product (e.g., the chip 202, RAM 204, and CPU 206). The PLM can also track an issue 208 (e.g., defects/bugs) found with the pieces that make up the product, such as the chip 202, RAM 204 and CPU 206. The issue 208 indicates a problem found with the CPU 206. The issue 208 can further indicate a defect 210 raised as a result of the issue 208. The defect 210 is linked to the CPU 206 because the issue 208 is directly with the CPU 206. The defect 210 further has an 'impacts' relationship with the chip 202 because the CPU 206 is a sub-component of the chip 202, so defects 210 with the CPU 206 impact the chip 202.

In many of these cases, rolled up data is used to provide an overall status of the product. For example, a product such as a computer chip can be made up of multiple components, such as a RAM memory and a Central Processing Unit (CPU). If an issue is found with the CPU and a defect is raised, then the manager of the chip may request a rolled-up report indicating that this defect exists in a sub-component and thus impacts the chip having the CPU and the RAM. The PLM accurately tracks data including the hierarchical connection/usage of sub-blocks by a higher level product.

Figure 3:
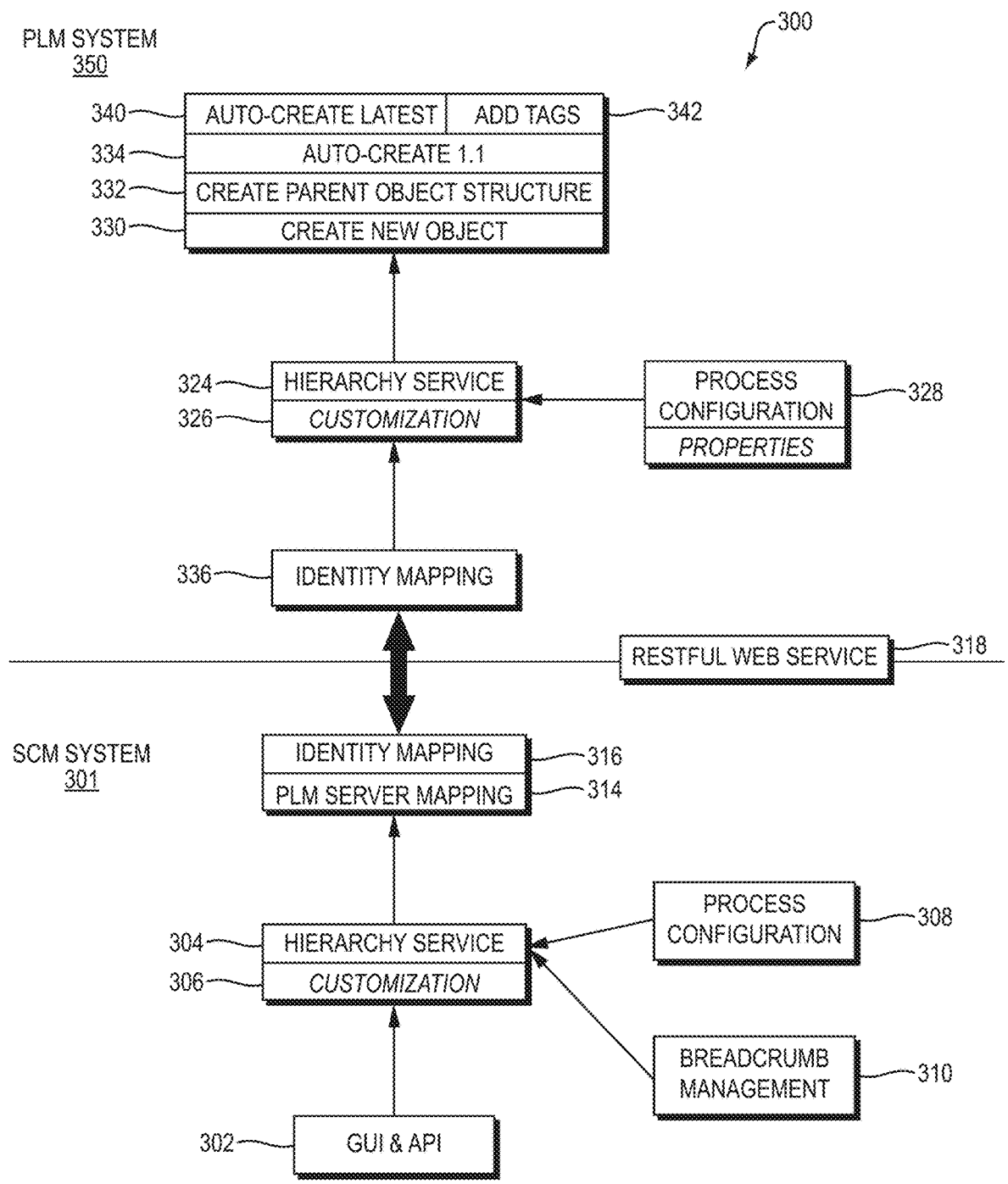
FIG. 3 is a block diagram illustrating sending modules from an SCM system to a PLM system according to an embodiment of the present invention.

FIG. 3 is a block diagram 300 illustrating sending modules from an SCM system 301 to a PLM system 350 according to an embodiment of the present invention.

The SCM system 301 includes an interface module 302 having a graphical user interface (GUI) and/or a command line interface (CLI) based on an application programming interface (API). The GUI is provided for the end-user to access the functionality on the SCM system 301 to request that specific hierarchy of code modules be synchronized with the PLM system 350. The GUI includes a form enabling user input of details of the top-level code module to be synchronized and identification of the versions to pushed from the SCM system 301 to the PLM. The system allows for multiple different versions of the object to be pushed simultaneously or contemporaneously. In addition, the form allows the user to identify whether to push the hierarchy of code modules, or only particular levels (e.g., the first levels only). The system also supports a dry run mode that supports reporting details of hypothetical operation(s) back to the user without carrying out the operation. The system further supports a report mode that controls the detail of the output returned.

The interface module also provides a CLI, for example using the tool command language (TCL) extension language that is supported by the DesignSync® products. The CLI consists of a command line that can be provided with the same inputs that can be specified via the GUI form.

The SCM system 301 also includes a hierarchy service module 304 that extracts the information on the hierarchy of data modules to be synchronized to the PLM system 350. In an example embodiment, the hierarchy service module 304, for example, employs the showhrefs function of the SCM system 301 to create a structure in XML format to be passed to the PLM system 350 for processing. The hierarchy service module 304 passes that created structure to the PLM system 350 and waits for the result. The return result includes a log of the operations performed, which is reported back to the user, plus additional information that is processed by the breadcrumb management system 310 described below.

The system further includes a customization layer 306 operatively coupled with the hierarchy service 304. The customization layer 306, after extraction of the hierarchical information, allows modification or extension of the data. This includes of an optional TCL function that can be provided by the end user or system administrator. The TCL function, upon being called, is passed the extracted data as argument(s). The TCL function can modify the data to change values, or extend the data with additional information for each data element. The additional values are then passed to the PLM system 350.

The SCM system 301 further includes a process configuration module 308. The import process that the PLM system 350 is configured to carry out responsive to the SCM system 301 can be further configured from the SCM system 301. For example, the type of objects to be created on the PLM system 350 may depend on the source SCM system 301. The process configuration module reads process configuration settings from a database and applies the process configuration settings to the data before sending the data to the PLM system 350. The example implementation allows configuration parameters to be set in registry files either manually or via a graphical tool.

The SCM system 301 further includes the breadcrumb management system 310. Once the PLM system 350 processes the data, the PLM system 350 returns the data structure to the SCM system 301 augmented with information about the objects created in the PLM system 350. In the example implementation, the augmentation includes unique object identifiers for created data in the PLM system 350. This information is then processed by the breadcrumb management system 310 and stored as properties with the data of the SCM system 301 such that it is available for other operations to use on the SCM system 301.

The SCM system 301 further includes a PLM server mapping module 314 and an identity mapping module 316. SCM system 301 knows the address of the PLM system 350 to communicate with it. The server mapping module 314 allows the PLM system 350 addressing information to be provided in a flexible and data-dependent fashion. An organization commonly has a single organization-wide PLM system 350, and therefore a single address for that system suffices. However, the server mapping module 314 supports more complex installations with multiple PLMs or distributed PLMs having multiple addresses. The user or administrator can specify mappings between the SCM system 301 objects and the PLM platform address(es) using a configuration tool, which is optionally graphical.

In addition, identities of users can be different between systems (e.g., different user names or user IDs). For example, SCM system 301 can typically employ the user's system login name for identification, but the PLM system 350 may use a corporate-wide identity or an email address to login. The optional identity mapping module 316 provides a customizable system for mapping the user's SCM system 301 identity to an identity on the PLM system 350. In a particular embodiment, the IDs are the same between the PLM system 350 and SCM system 301 and no mapping is required.

The SCM system 301 further includes a communication layer. In the sample implementation, a RESTful Web Service 318 is used for the communication between the SCM system 301 and the PLM system 350. Other means of communication that provide a scheme for passing the data describing the hierarchy and plus the user identity information from the SCM system 301 to the PLM system 350 and provide for the return of updated information can be used.

The PLM system 350 includes an identity mapping module 336 to optionally perform identity mapping on the PLM system 350 as well. Providing identity mapping on the PLM system 350 and SCM system 301 systems allows for greater flexibility because a) if the user IDs from all SCM servers are consistent, then implementing a single identity mapping in the PLM system 350 is sufficient and b) if individual SCM servers have different user IDs, but there is a single PLM system 350, then implementing identity mapping at each SCM server is appropriate. The identity mapping module on the SCM system 301 side of the example implementation maps the identity coming from the SCM system 301 to an identifier on the PLM system 350.

A hierarchy service 324 on the PLM system 350 accepts the data from the SCM system 301 and controls the overall process. The hierarchy service 324 calls routines to create the different objects in the PLM system 350 and to link the created objects together to form a hierarchy in the PLM system 350. The hierarchy service 324 also augments the data with breadcrumb information and also returns a log of the operation to the SCM system 301.

After creation of new data, a customization layer 326 of the PLM system 350 augments the data with additional information been passed from the SCM system 301 or allows the data to be otherwise manipulated in ways prohibited by original configuration settings. For example, if an individual use of the functionality wanted to name objects differently than the default, the customization layer 326 can rename the objects. The optional renaming method is passed all the information on what is being imported and the equivalent new objects that are created in the PLM system 350.

The PLM system 350 can be further configured by provision of settings that are read and applied by process configuration module(s) 328. For example, the PLM system 350 can configure the type of objects to be created in this way. For example, the configuration can be via a property file having customized values for various specified configuration parameters.

An object creation module 330 creates objects in the PLM system 350. The object creation module 330 leverages the information from the SCM system 301 and the configuration parameters to determine the details of the objects to be created. In addition, a create parent object module 332 may create associated parent objects. In the case of the sample implementation this includes an auto-create module 334 configured to create additional versions of the objects to act as root versions or work in process versions to support an entire derivation tree of versions. An auto-create latest module 340 can create ancillary parent objects acting as containers for the objects being created the module based on all of the gathered information described above. A create history module 334 can load past version information of the module as well into the module created by the auto-create latest module 340. An add tag module 342 can further be configured to add tags or aliases to the created items.

For example, the object creation involves creation of, a product object by default, and revisions to represent the version of the data from the SCM system, plus the version actually being imported. The new objects are connected together to form a hierarchy of products.

In addition, the products can be connected to parent model and product line components, which are other object types used in the PLM system for general management of the product development process.

Figure 4:
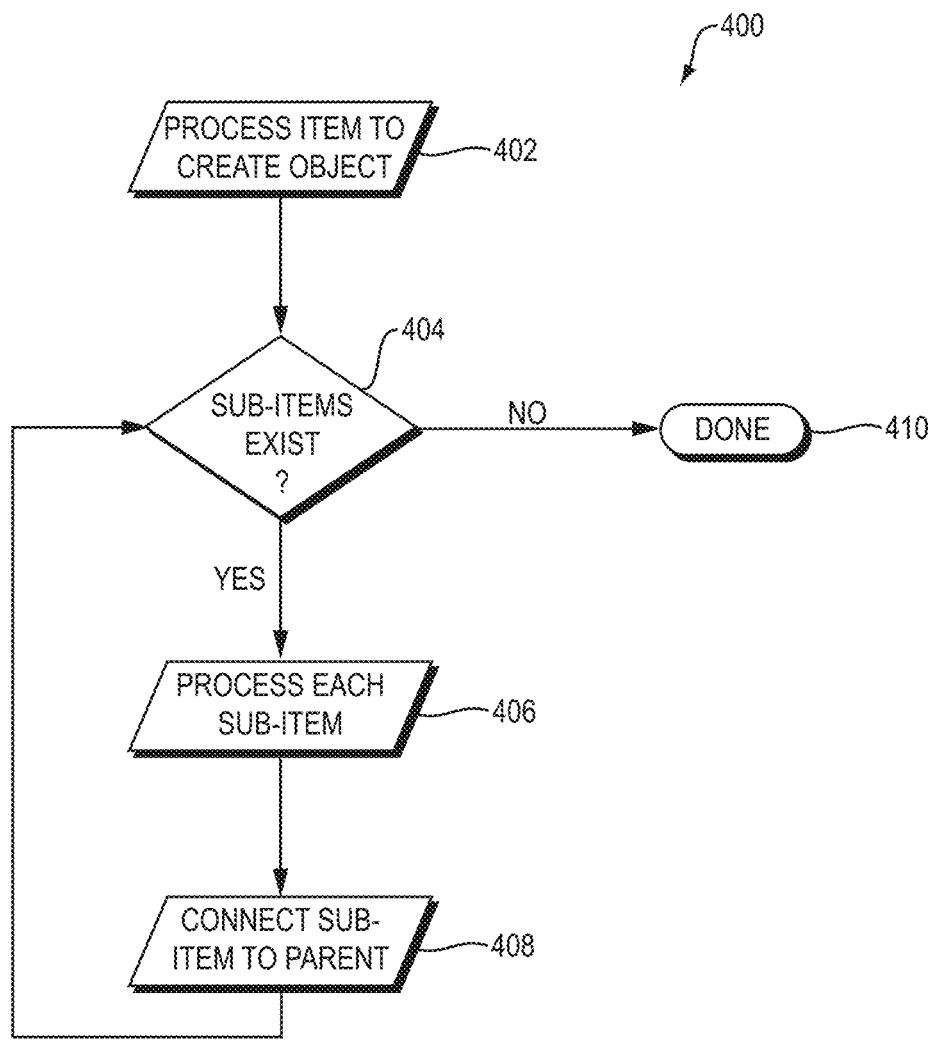
FIG. 4 is a flow diagram illustrating an example embodiment of a process employed by the present invention.

FIG. 4 is a flow diagram 400 illustrating an example embodiment of a process employed by the present invention. Responsive to the PLM system receiving import data from the SCM system from a process initiated by the SCM system, the PLM system processes the item in the import data to create an object in the PLM system (402). The PLM system determines whether sub-items exist (404). If so, the system processes each sub-item of the parent (406) and connects each sub-item to the parent item (408). Then, the PLM system determines whether sub-items exist for each created sub-item (404). If no sub-items exist, the process finishes for the current sub-item branch (410). Eventually all branches finish (410) and the process ends.

Figure 5:
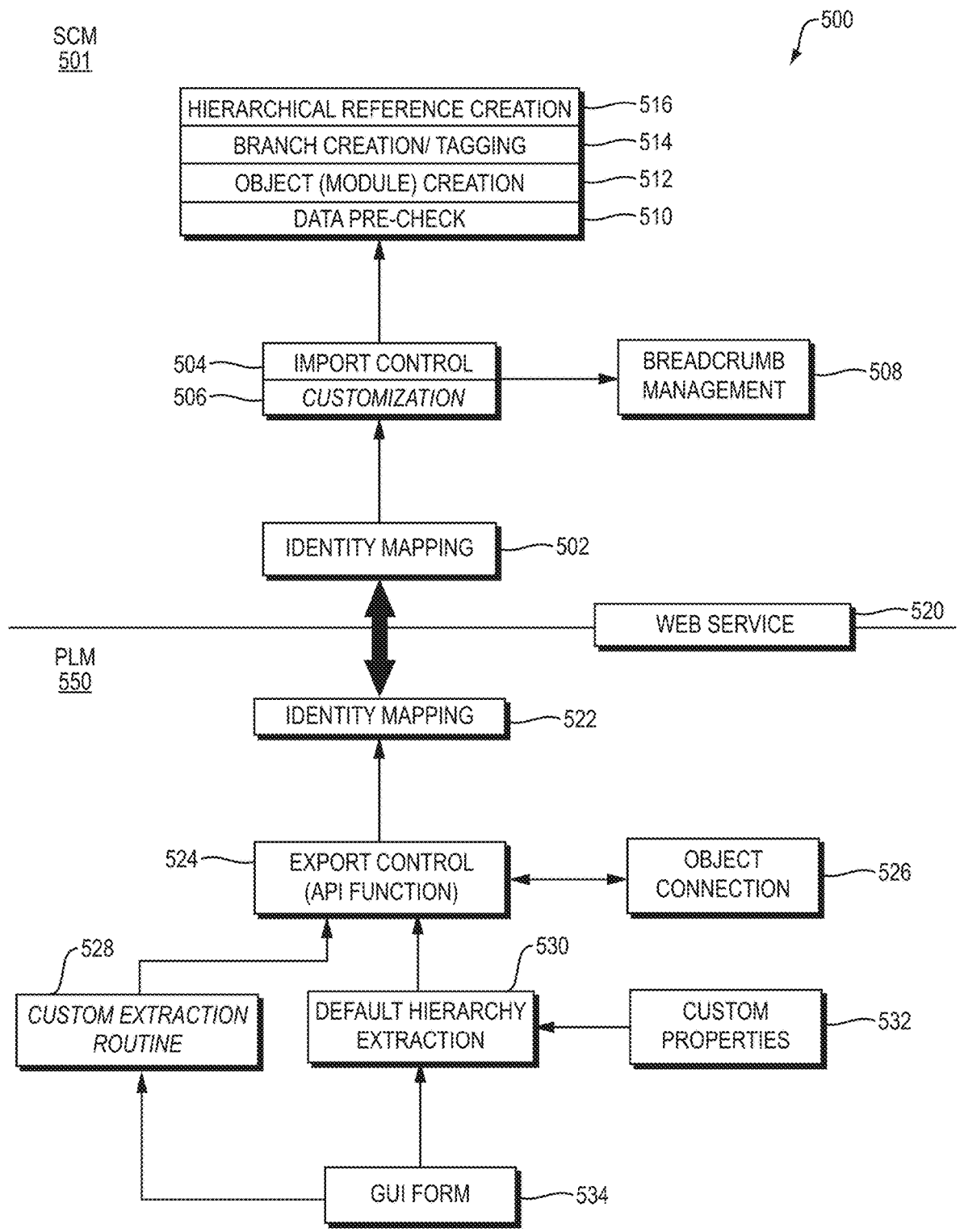
FIG. 5 is a block diagram illustrating an example embodiment of importing PLM system object data into a SCM system.

FIG. 5 is a block diagram 500 illustrating an example embodiment of importing PLM system 550 object data into a SCM system 501.

The PLM system 550 includes a graphical user interface (GUI) 534 for user to initiate exporting a hierarchy of objects to the SCM system 501. The GUI 534 includes a form allowing the user to specify whether the objects created in the SCM system 501 are connected as a cone structure or a peer structure. A cone structure organizes the files for a sub-object in the hierarchy into a physical directory that is under the directory of the parent. A peer structure organizes files for the sub-object in a hierarchy into parallel physical directories. The GUI form also allows the user to specify whether the export is an initial export or update export. This setting controls factors around whether items are reused within the SCM system 501.

The PLM system 550 also stores SCM Connection Information, which identifies the target SCM system server and where on that server the object representing the top-level object from the PLM system is located. For example, this is via:
   a) a store, which identifies the SCM server;
   b) a path, which identifies the position on that server of the object; and
   c) a selector which identifies the version of the SCM object that is linked to the PLM object.

An implementation of the PLM system 550 can directly call the export control module 524 using an API function, allowing for a full custom control of the system.

The PLM System 550 also includes a default hierarchy extraction module 530. For example, the default extraction module 530 provides a default extraction process, however the default process can be overridden. The default hierarchy extraction module 530 extracts information on the hierarchy of data objects in the PLM system 550 to be exported to the SCM system 501. In the sample implementation, the extraction employs database lookups and queries to extract the hierarchy of product objects. The extraction process further creates a data structure (e.g., Java data structure) that is passed to the export control module 524.

The PLM System 550 also includes a custom properties module 532. The custom properties module 532 can provide customizations to the import, even to the default hierarchy extraction process described above. The custom properties module 532 modifies a set of property or configuration values which can control, for example, where new objects in the SCM system are created relative to the storage location of the parent or top-level object.

The PLM system 550 also includes a module custom extraction module 528 as an alternative to the default extraction module 530. The custom extraction module 528 can, for example, process different types of objects in the PLM system 550, or specify a custom scheme for determining which objects in the hierarchy are represented in the SCM system 501 and which are only present for PLM purposes, and therefore do not need to be copied to the SCM system 501.

The export control module 524 then controls the rest of the export process. The export control module 524 is configured to:
   a) Call the process to perform any identity mapping at the identity mapping module 522;
   b) Call a web services layer 520 to pass all the data to the SCM server;
   c) Receive the results back from the SCM system 501;
   d) Store any local connections (e.g., breadcrumbs) to the data on breadcrumb management module 508 of the SCM server; and
   e) Display a report of the overall process back to the user (or returning this as a log script to the caller).

The PLM system 550 further includes an object connection module 526. The data passed back from the SCM system 501 includes the address of the created SCM object(s) that match the PLM objects. The address of each created SCM object includes both the actual object identifier (e.g., in the form of a URL) and a selector identifying the version of the SCM object to link to the PLM object. This information is stored with the PLM objects to form a connection with the corresponding SCM objects.

The PLM system 550 includes an identity mapping module 522 (optionally). Identities of users can be different between systems. For example, the SCM system 501 typically can use the user's system login name for identification, but the PLM system 550 might use an organization-wide identity or an email address for login. The identity mapping module 522 provides a customizable system for mapping the user identity as it is known to the PLM system 550 to an identity on the SCM system 501. Identity mapping is optional: In a particular system, the users' identities are the same between the two systems and mapping is not necessary.

The PLM system 550 further includes a communication layer 520, (e.g., a SOAP-based web service) for communication between the PLM system 550 and the SCM system 501. Alternatively, the SCM system 501, the PLM system 550 and SCM system 501, or another entity can include the communication layer 520. Other means of communication can be employed that provide a scheme for passing the data describing the hierarchy and the user identity information from the PLM system 550 to the SCM system 510, returning updated information, logging output, and returning values.

The SCM system 501 can include an identity mapping module 502. Identity mapping is optionally performed on the SCM system 501 as well as the PLM system 550. Providing identity mapping on both systems allows for greater flexibility: a) If the user names used in all SCM servers are consistent, then implementing a single identity mapping in the PLM system is sufficient; b) If individual SCM servers have different user identities, but there is a single PLM system, then implementing identity mapping at each SCM server is appropriate. The identity mapping module on the SCM side of the sample implementation provides for a customized function to be supplied which maps the identity coming from the PLM system to an identifier on the SCM system.

The SCM system 501 includes an import control module 504 having a customization layer 506. The import control module 504 accepts the data from the PLM system 550 and controls the import. The import control module 504 creates the different objects in the SCM system 501 and links them together to form a hierarchy in the SCM system 501. The import control module 504 further augments the data with breadcrumb information and also returns a log of the operation to the PLM system 550.

The customization layer 506 can be activated either before or after the importing the data. Prior to the import, the customization layer 506 can revise the data as it is received from the PLM system 550. For example, the customization layer 506 identifies and removes items inappropriate for representation on the SCM system 510. After the import, the customization layer 506 is passed both the data from the SCM system 501 and information on the newly created SCM objects. For example, the customization layer 506 receives information from the PLM system 550 and sets properties on the SCM objects (e.g., an author value can be passed from the PLM system and set on the SCM objects).

The SCM system 501 further includes a breadcrumb management module 508. As the data is created in the SCM system, breadcrumbs are stored to link the new SCM items with the objects in the PLM system. In the example implementation, the data sent from the PLM system 550 includes the object identifier for the SCM objects (e.g., integers being unique identifiers for the objects). The object identifiers from the PLM system 550 are set as properties of the objects created in the SCM system 501 (e.g., the modules, branches and/or versions.)

The SCM system 501 further includes a data pre-check module. The SCM system in addition includes a module (or object) creation module 512. The module creation module 512 is configured to create the module in the SCM system 501 representing the module from the PLM system 550, if the module does not already exist. A branch creation and tagging module 514 further can create different branches of the module based on its version progression and can further tag the versioning data to the modules. A hierarchical reference creation module 516 can create references between the created modules and existing modules representing the hierarchical relationships between the modules in the SCM system 501 as they exist on the PLM system 550.

Figure 6:
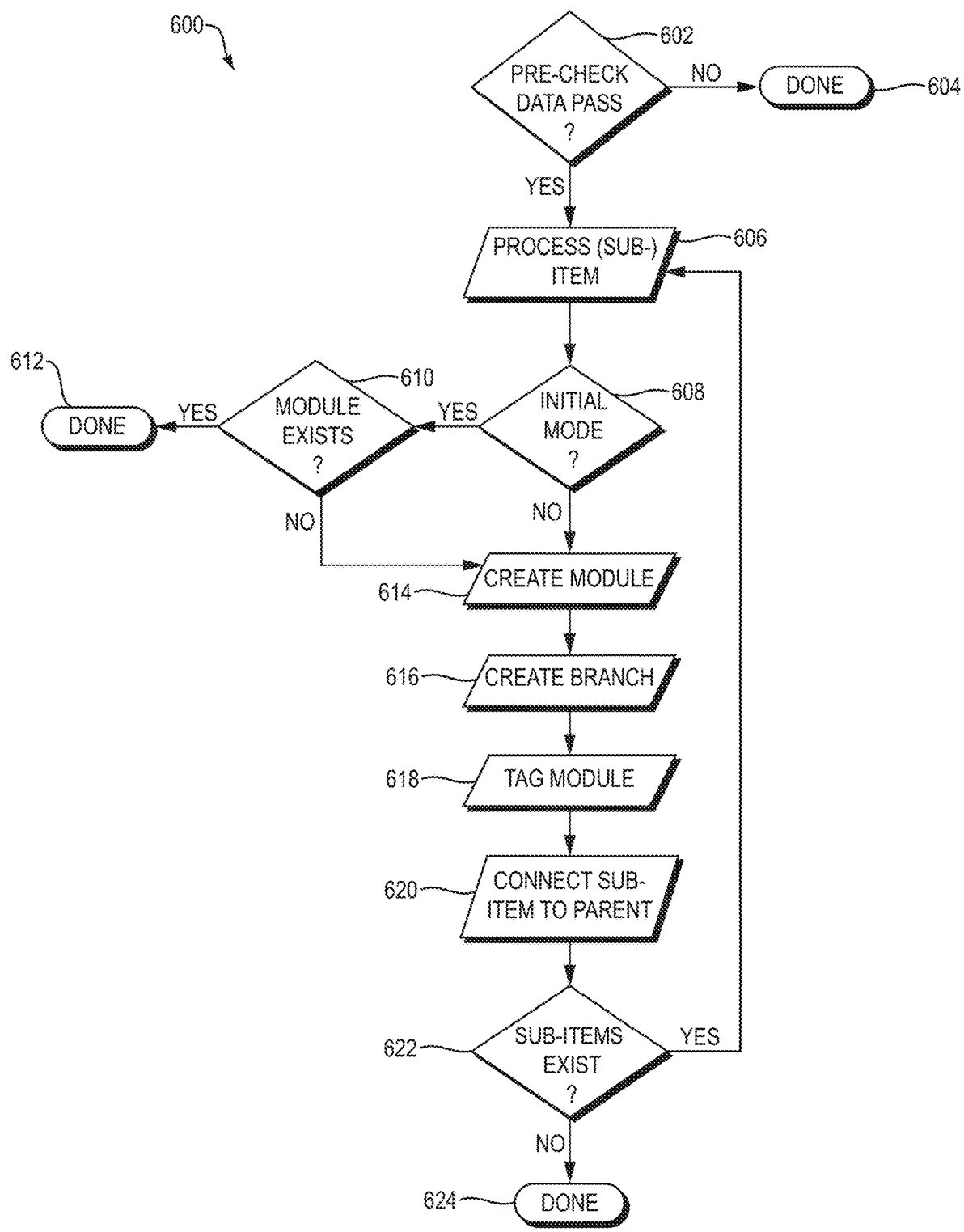
FIG. 6 is a flow diagram illustrating an example embodiment of a process employed by the present invention for importing data from a PLM system into an SCM system.

FIG. 6 is a flow diagram 600 illustrating an example embodiment of a process employed by the present invention for importing data from a PLM system into an SCM system. The SCM system begins by pre-checking data (602). In embodiments, pre-checking can include checking the data for "gross" errors that can be found by "static" checking, in order to prevent the process from failing later on. Examples of criteria in a pre-check can include, but are not limited to, checking that the "selector" values and "names" passed in are valid on the target system. If the data pre-check fails, the process ends (604).

However, if the pre-check passes, the SCM system processes a top-level item of the data (606). The SCM system determines whether the import is in initial import mode or existing import mode (608). If this is an initial import, the system determines whether the SCM object exists in the SCM system (610). If so, then imported module is likely a pre-existing module that is being re-used, and therefore all data below this point is already correct, and the process can end at this point (612). If the object is not a pre-existing module, rather than creating a new SCM object, the existing SCM object can be updated with a new set of links to sub-objects. It may still be necessary to create new sub-objects.

If the module does not exist (610) or the system is not in initial mode (608), the system the SCM system creates a corresponding module representing the PLM object if necessary (e.g., if there is no module representing the PLM object already existing in the SCM) (614), creates a development branch of the created SCM object having a set of version including an initial version (616), and adds tags via the tag module (618). If the data from the PLM system indicates that the objects are a fixed released version of the SCM data, then that the system tags the versioning data, creating a fixed reference to a version of the SCM data. However, if the PLM data indicates that the object is a work in progress, then the connection is made to the tagged branch of the SCM data. In other words, it connects to the latest version of data on that branch. The PLM system can therefore represent both fixed/finalized modules and the development that is in progress.

The SCM system then connects the sub-item to its parent (620). For all but the top-level item in the hierarchy, the system connects the sub-item to its parent object using the SCM commands to effect that connection. In the example DesignSync® system, this includes creating an href (hierarchical reference) from the parent module to the child module, and this href identifies a) the child module, b) the version of the child module to use (e.g., as a version selector), and c) an href path indicating where the child module data is placed, relative to the parent module, when it is fetched from the SCM system. This last is where the href path value of cone or peer comes into effect. For a cone structure the href path value is a sub-directory name on the file system, which places the data below the parent module data. For a peer structure the href path value is in the form " . . . /directory-name", meaning that the data is placed parallel to the parent module data on the file system.

The SCM system then determines whether sub-items exist (622). In other embodiments, the order of the process may be different because, depending on the SCM system and its capabilities, it may be necessary to create all the sub-items recursively before creating a parent object, for example. However, in this example, the recursive step takes place before creating the parent object. If sub-items exist, the system processes the sub-tem (606). If not, the SCM system ends the process (624).

Figure 7:
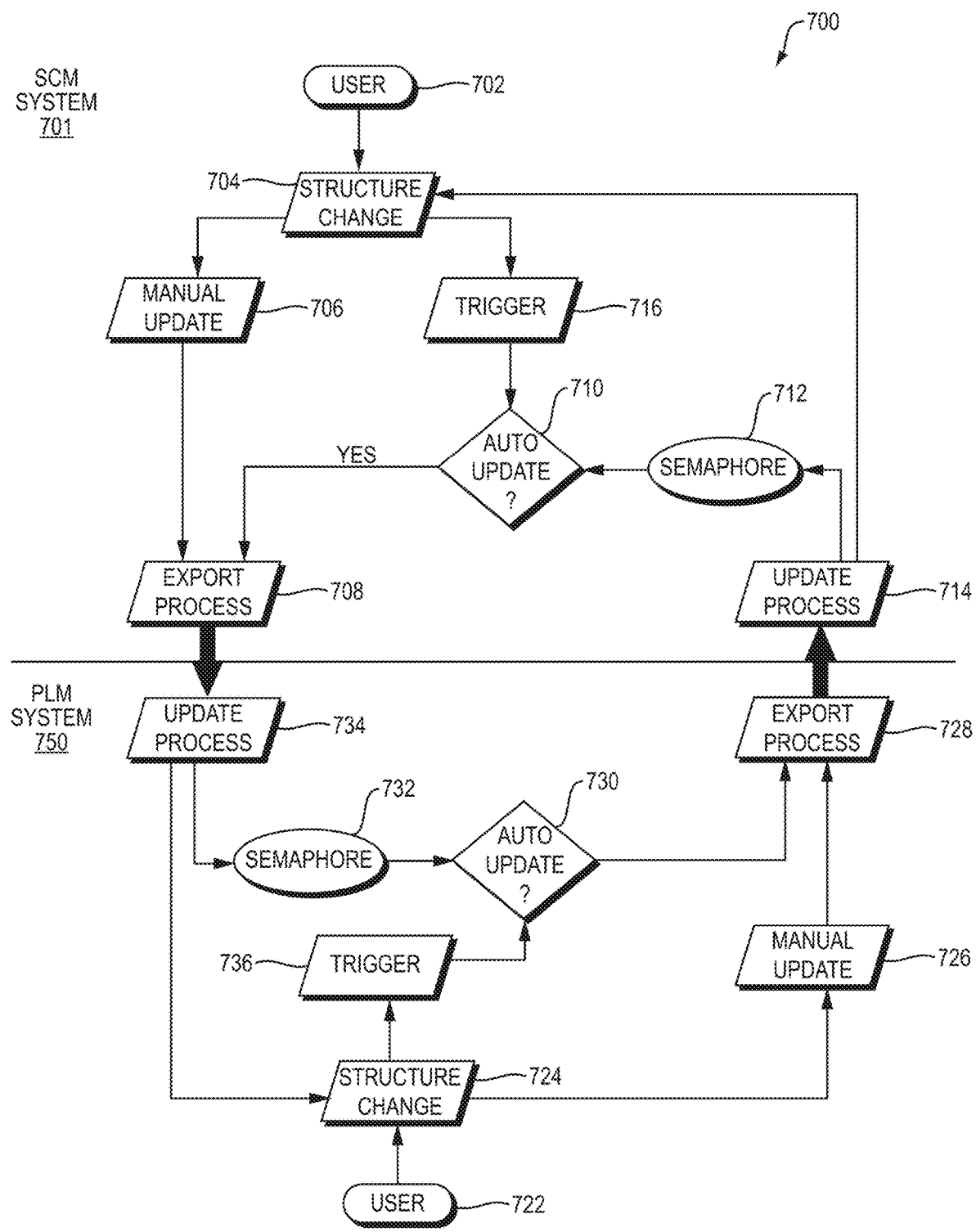
FIG. 7 illustrates is a flow diagram illustrating an example embodiment of a process employed by the present invention of automatically updating imported information in an SCM or PLM system upon a change to a corresponding module in the other system.

FIG. 7 illustrates is a flow diagram 700 illustrating an example embodiment of a process employed by the present invention of automatically updating imported information in an SCM or PLM system upon a change to a corresponding module in the other system. The automatic update process is similar at a high level whether moving data to or from the PLM or to or from the SCM, respectively, however implementation details can differ. The below describes an update initiated by a user 702 of the SCM system 701 causing a structure change 704, however, similar descriptions can apply to the PLM system 750, its user 722 and corresponding structure change 724.

The process begins when a user 702 of the SCM system 701 performs an operation causing a change to the structure of the data (704). Such a change can be any combination of:

(1) an addition or removal of a hierarchical reference from one object to a sub-object. A hierarchical reference is a reference from a higher level object in a structure to a lower level object (e.g., link between the chip module and the CPU); or (2) a modification of a hierarchical reference (e.g., modification of some aspect of the hierarchical reference that is reflected between the two systems). Such a modification can be, for example, a change in the version of the referenced object to be used or a change in the relative path (e.g., rel path) to be used to decide where the sub-object data is placed in a file system relative to the parent object.

A structure change can impact the overall hierarchical structure: adding or modifying a single reference to a sub-block can change to the entire hierarchy from that point downwards.

In a manual update (706), the GUI provided on the SCM system 701 and PLM system 750 for the user accesses functionality to request export (708) of a specific hierarchy of objects to the other system.

To provide an automated update, an embodiment of the present invention is triggered automatically as changes are made to the data (716). The trigger is called for all changes that modify the structure of the data, ensuring that synchronization of the data is always performed. The trigger is called transactionally such that that the trigger is called only once if multiple structure changes are performed in a single user operation. This avoids unnecessary work/data transfers by passing changes to the target system once. Upon the trigger activating, the SCM system 701 accesses breadcrumbs that are stored to link the objects in the PLM system 750 to the SCM system 701 or vice-versa. This ensures that updates are passed to the target system for data that is being represented on both systems. There may be data in the first system which is not intended to be reflected on the second system. The automatic update system avoids reflecting unnecessary data by the first synchronization of a block being either manual or as a result of synchronization of a referencing parent object and subsequent automatic synchronization being based on the presence of the breadcrumbs.

The SCM system 701 then performs an auto-update step (710), which calls the export process, which is described above for each system (708).

On the PLM system, the update process (734) performs the same kinds of structural changes described above in relation to each system that the end user performs using the same APIs. Importantly, the update process (734) is modified to set a semaphore flag on a calling system (732). The semaphore flag prevents the automatic trigger from firing as changes are made on the target system, which causes the data to be re-sent back to the calling system, potentially causing an infinite loop. Implementing the semaphore (732) blocks the trigger for updates made by the update process, but allows the trigger to make other changes from users. In multi-threaded systems, like typical SCM and PLM systems, there is a danger that the trigger is disabled while the update process takes place. The disablement then blocks some action on a different thread from firing the trigger. The implementation of the semaphore depends on the capabilities of the SCM and PLM systems being used. However, one example implementation includes (1) blocking all new threads from starting; (2) waiting for all other running threads to finish; (3) blocking the trigger; (4) performing the updates needed by the update process; (5) unblocking the trigger; and (6) allowing new threads to be started.

The semaphore process (732) ensures that other operations do not take place while the trigger is blocked. A more sophisticated system employs transactions for all the database changes required for the update process and blocks the trigger only during the time when this transaction is being committed to the database, making use of the fact that the transaction commitment to the database is single-threaded.

The process in the other direction begins when a user 722 of the PLM system 750 performs an operation causing a change to the structure of the data (724). Such a change can be any combination of:

(1) an addition or removal of a hierarchical reference from one object to a sub-object. A hierarchical reference is a reference from a higher level object in a structure to a lower level object (e.g., link between the chip module and the CPU); or (2) a modification of a hierarchical reference (e.g., modification of some aspect of the hierarchical reference that is reflected between the two systems). Such a modification can be, for example, a change in the version of the referenced object to be used or a change in the relative path (e.g., rel path) to be used to decide where the sub-object data is placed in a file system relative to the parent object.

A structure change can impact the overall hierarchical structure: adding or modifying a single reference to a sub-block can change to the entire hierarchy from that point downwards.

In a manual update (726), the GUI provided on the PLM system 750 and SCM system 701 for the user accesses functionality to request export (728) of a specific hierarchy of objects to the other system.

To provide an automated update, an embodiment of the present invention is triggered automatically as changes are made to the data (736). The trigger is called for all changes that modify the structure of the data, ensuring that synchronization of the data is always performed. The trigger is called transactionally such that that the trigger is called only once if multiple structure changes are performed in a single user operation. This avoids unnecessary work/data transfers by passing changes to the target system once. Upon the trigger activating, the PLM system 750 accesses breadcrumbs that are stored to link the objects in the SCM system 701 to the PLM system 750 or vice-versa. This ensures that updates are passed to the target system for data that is being represented on both systems. There may be data in the first system which is not intended to be reflected on the second system. The automatic update system avoids reflecting unnecessary data by the first synchronization of a block being either manual or as a result of synchronization of a referencing parent object and subsequent automatic synchronization being based on the presence of the breadcrumbs.

The PLM system 750 then performs an auto-update step (730), which calls the export process, which is described above for each system (728).

On the SCM system 701, the update process (714) performs the same kinds of structural changes described above in relation to each system that the end user performs using the same APIs. Importantly, the update process (714) is modified to set a semaphore flag on a calling system (712). The semaphore flag prevents the automatic trigger from firing as changes are made on the target system, which causes the data to be re-sent back to the calling system, potentially causing an infinite loop. Implementing the semaphore (712) blocks the trigger for updates made by the update process, but allows the trigger to make other changes from users. In multi-threaded systems, like typical SCM and PLM systems, there is a danger that the trigger is disabled while the update process takes place. The disablement then blocks some action on a different thread from firing the trigger. The implementation of the semaphore depends on the capabilities of the SCM and PLM systems being used. However, one example implementation includes (1) blocking all new threads from starting; (2) waiting for all other running threads to finish; (3) blocking the trigger; (4) performing the updates needed by the update process; (5) unblocking the trigger; and (6) allowing new threads to be started.

The semaphore process (712) ensures that other operations do not take place while the trigger is blocked. A more sophisticated system employs transactions for all the database changes required for the update process and blocks the trigger only during the time when this transaction is being committed to the database, making use of the fact that the transaction commitment to the database is single-threaded. The export and import processes described above are modified for automatic updating. Specifically, the export part of the process gathers data from the source system. In automatic update, any existing breadcrumb or tracking data is extracted along with the structure. The import side of the process performs the majority of the work to create or modify the data on the target system. In automatic update, when checking to see if an object already exists on the system, the breadcrumb data is used. If there is breadcrumb data, an existence check is performed to ensure the object exists. If an object already exists, then the references from that object to sub-objects may still need to be updated. New sub-objects may have been added, and corresponding new references may be created. References to sub-objects may have been removed on the source system, and the corresponding references on the target system may need to be removed as well. Attributes of references (e.g., the version of the target path or the href path used when fetching the data) may have been changed.

It also may not be possible to modify a target object if it is a static version. Static versions of objects in the PLM system 750 represent released items. These static versions cannot be modified, since they represent the state at a fixed point in the past. Changes are likely not allowed for such items, since the SCM system 701 itself prevents changes in such cases. If changes on static versions are attempted, then the import process accurately reports the issue back to the SCM system 701 for the user to correct at that level.

The export and import processes described above are modified for automatic updating. Specifically, the export part of the process gathers data from the source system. In automatic update, any existing breadcrumb or tracking data is extracted along with the structure. The import side of the process performs the majority of the work to create or modify the data on the target system. In automatic update, when checking to see if an object already exists on the system, the breadcrumb data is used. If there is breadcrumb data, an existence check is performed to ensure the object exists. If an object already exists, then the references from that object to sub-objects may still need to be updated. New sub-objects may have been added, and corresponding new references may be created. References to sub-objects may have been removed on the source system, and the corresponding references on the target system may need to be removed as well. Attributes of references (e.g., the version of the target path or the href path used when fetching the data) may have been changed.

It also may not be possible to modify a target object if it is a static version. Static versions of objects in the SCM system represent released items. These static versions cannot be modified, since they represent the state at a fixed point in the past. Changes are likely not allowed for such items, since the PLM system itself prevents changes in such cases. If changes on static versions are attempted, then the import process accurately reports the issue back to the PLM system for the user to correct at that level.

Ideally, changes in structure are limited to a single layer of the design within a single operation. For example, an operation might add a reference from the top level chip to a new ALU block, but does not at the same time modify the structure under the CPU block that the chip already references. If that is guaranteed, then the whole update process can be optimized so that a single layer of structure is passed between the systems and updated at a time. However, in most systems this cannot be guaranteed and, in the example given, the ALU can be a whole new hierarchical structure to be represented in the other system.

In addition, for safety and to handle any error conditions, a process forces a re-synchronization of the entire hierarchy. Therefore, the system always sends the entire structure (e.g., from the top-level modified object down) for any operation, and that this is checked against the target system on import. This approach is much heavier in terms of performance and system requirements but is more accurate.

Figure 8:
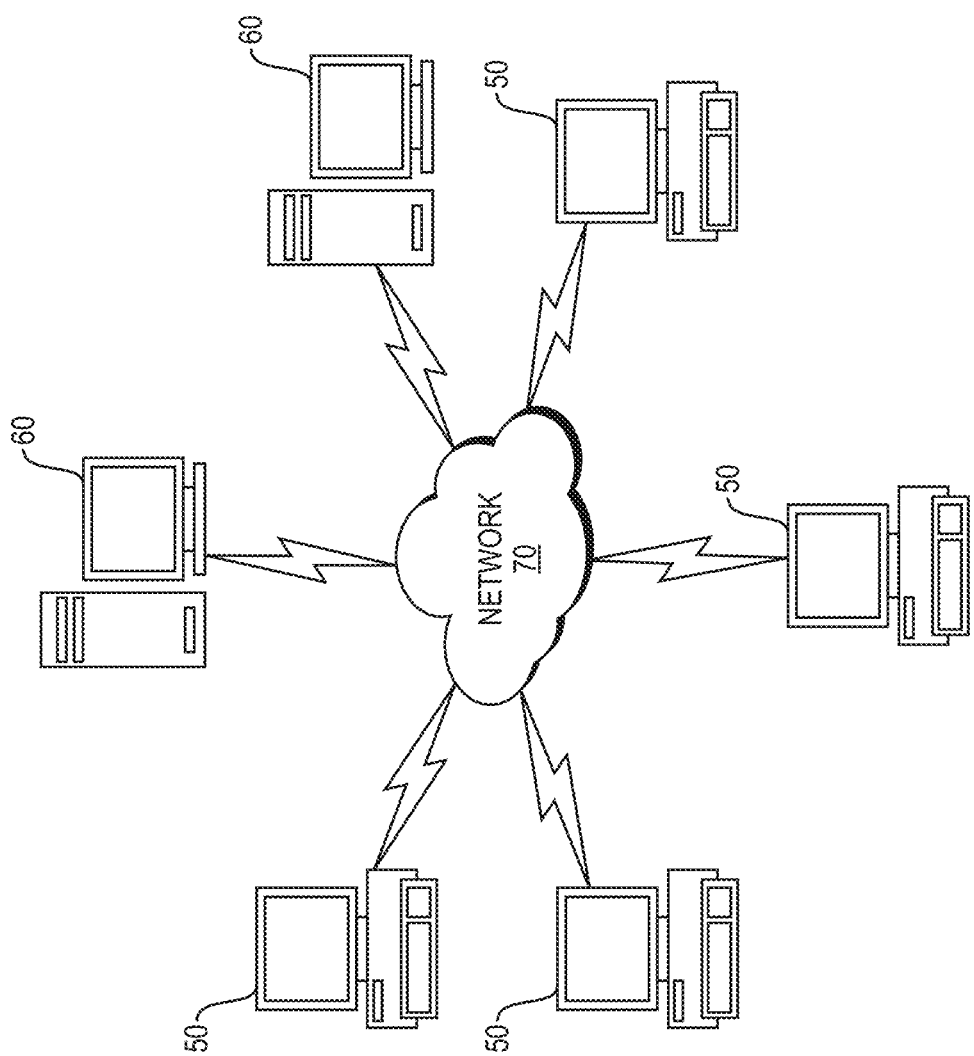
FIG. 8 illustrates a computer network or similar digital processing environment in which embodiments of the present invention may be implemented.

FIG. 8 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 9:
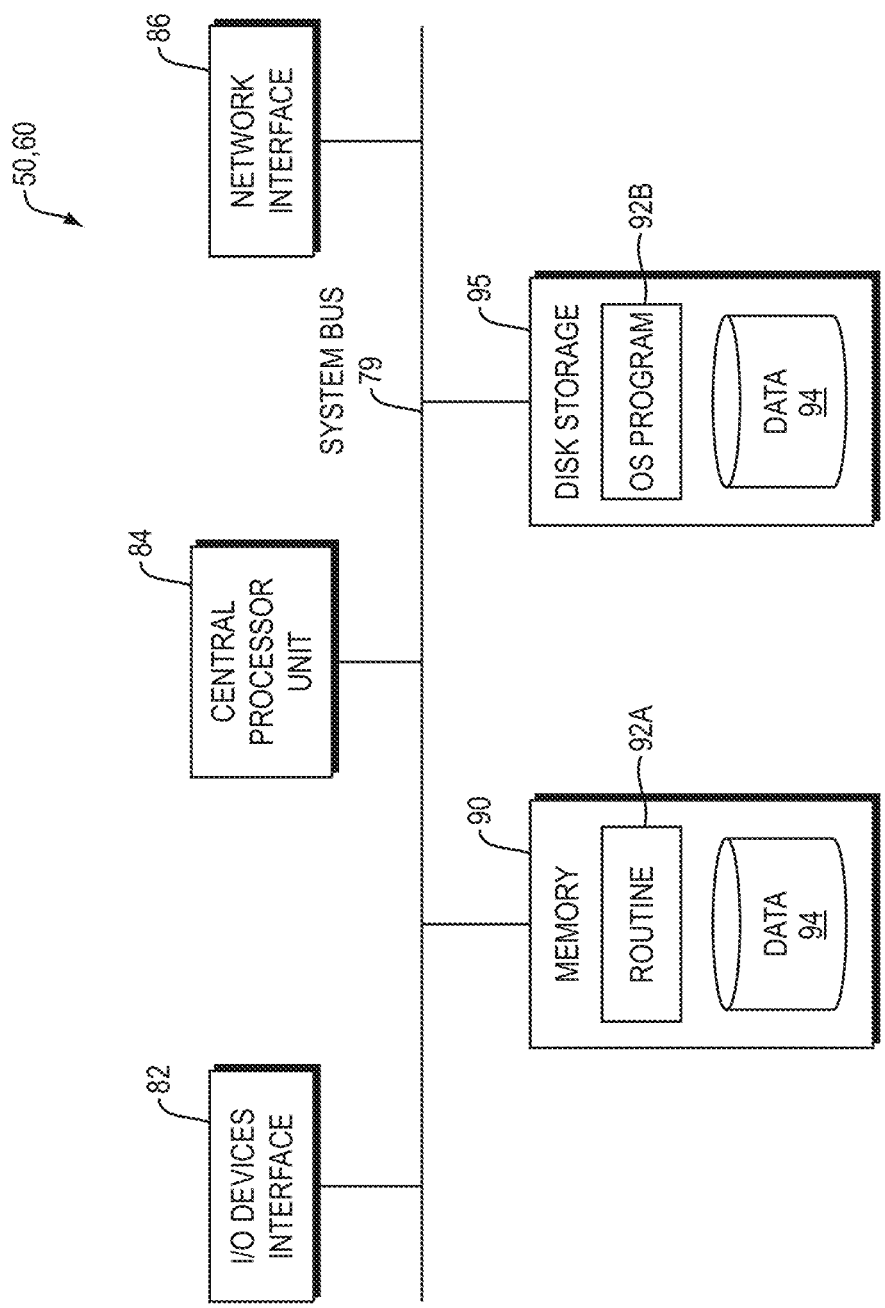
FIG. 9 is a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present invention (e.g., extraction module, creation module, and mapping module detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

While this invention has been particularly shown and described with references to example embodiments thereof, it will be understood by those skilled in the art that various changes in form and details may be made therein without departing from the scope of the invention encompassed by the appended claims.

What is claimed is:

1. A computer method comprising:
responsive to a user request to transfer a module from a source code management (SCM) system to a product lifecycle management (PLM) system, extracting, from a processor at the SCM system, data representing modules, versions of the modules, and hierarchical relationships of the modules from a data source of the SCM system;
creating a PLM system module having the extracted data representing the modules, versions of the modules, and the hierarchical relationships of the modules; and
sending a semaphore to the PLM system, the semaphore configured to cause, at the PLM system:
blocking initiation of new update thread;
waiting for existing running update threads to complete;
blocking an automatic update process from starting;
performing updates in response to the created PLM system module;
unsetting the semaphore to allow starting the automatic update process at the PLM system; and
allowing initiation of the new update threads.

2. The computer method of claim 1, further comprising:
customizing the extracted data to match data module requirements of the PLM system by retrieving additional information needed to create the PLM system module matching the data module requirements.

3. The computer method of claim 2, wherein creating the PLM system module employs the customized extracted data.

4. The computer method of claim 1, further comprising:
mapping an identity of the SCM system to a corresponding identity of the PLM system;
wherein the identity of the SCM system and the corresponding identity of the PLM system are distinct identifiers and also representing the same user entity.

5. The computer method of claim 1, further comprising:
providing a breadcrumb in the created PLM system module having a link to the module of the SCM system.

6. The computer method of claim 5, further comprising:
responsive to an update request, comparing a version of the created PL+M system module to a version of the linked module of the SCM system by accessing the breadcrumb; and
if the module of the SCM system is a newer version, updating the PLM system module to the newer version of the module of the SCM system.

7. The computer method of claim 1, wherein creating the PLM system module includes creating a plurality of PLM system modules corresponding to the hierarchical relationships of the modules from a data source of the SCM system.

8. A computer system comprising:
a processor; and
a memory with computer code instructions stored therein, the memory operatively coupled to said processor such that the computer code instructions configure the processor to:
responsive to a user request to transfer a module from a source code management (SCM) system to a product lifecycle management (PLM) system, extract, from a processor at the SCM system, data representing modules, versions of the modules, and hierarchical relationships of the modules from a data source of the SCM system;
create a PLM system module having the extracted data representing the modules, versions of the modules, and the hierarchical relationships of the modules; and
send a semaphore to the PLM system, the semaphore configured to cause, at the PLM system:
blocking initiation of new update threads;
waiting for existing running update threads to complete;
blocking an automatic update process from starting;
perform updates in response to the created PLM system module;
unsetting the semaphore to allow starting the automatic update process at the PLM system; and
allowing initiation of the new update threads.

9. The computer system of claim 8, wherein the processor is further configured to:
customize the extracted data to match data module requirements of the PLM system by retrieving additional information needed to create the PLM system module matching the data module requirements.

10. The computer system of claim 9, wherein creating the PLM system module employs the customized extracted data.

11. The computer system of claim 8, wherein the processor is further configured to:
map an identity of the SCM system to a corresponding identity of the PLM system;
wherein the identity of the SCM system and the corresponding identity of the PLM system are distinct identifiers and also representing the same user entity.

12. The computer system of claim 8, wherein the processor is further configured to:
provide a breadcrumb in the created PLM system module having a link to the module of the SCM system.

13. The computer system of claim 12, wherein the processor is further configured to:
responsive to an update request, compare a version of the created PLM system module to a version of the linked module of the SCM system by accessing the breadcrumb; and
if the module of the SCM system is a newer version, update the PLM system module to the newer version of the module of the SCM system.

14. The computer system of claim 8, wherein creating the PLM system module includes creating a plurality of PLM system modules corresponding to the hierarchical relationships of the modules from a data source of the SCM system.

15. A non-transitory computer-readable medium configured to store instructions for creating a product lifecycle management (PLM) module, the instructions, when loaded and executed by a processor, causes the processor to:
responsive to a user request to transfer a module from a source code management (SCM) system to a product lifecycle management (PLM) system, extract, from a processor at the SCM system, data representing modules, versions of the modules, and hierarchical relationships of the modules from a data source of the SCM system;
create a PLM system module having the extracted data representing the modules, versions of the modules, and the hierarchical relationships of the modules; and
sending a semaphore to the PLM system, the semaphore configured to cause, at the PLM system:
block initiation of new update threads;
wait for existing running update threads to complete;
block an automatic update process from starting;
perform updates in response to the created PLM system module;
unset the semaphore to allow starting the automatic update process at the PLM system; and
allow initiation of the new update threads.

16. The non-transitory computer-readable medium of claim 15, wherein the instructions further cause the processor to:
customize the extracted data to match data module requirements of the PLM system by retrieving additional information needed to create the PLM system module matching the data module requirements.

17. The non-transitory computer-readable medium of claim 16, wherein creating the PLM system module employs the customized extracted data.

18. The non-transitory computer-readable medium of claim 15, wherein the instructions further cause the processor to:
map an identity of the SCM system to a corresponding identity of the PLM system;
wherein the identity of the SCM system and the corresponding identity of the PLM system are distinct identifiers and also representing the same user entity.

19. The non-transitory computer-readable medium of claim 15, wherein the instructions further cause the processor to:
provide a breadcrumb in the created PLM system module having a link to the module of the SCM system.

20. The non-transitory computer-readable medium of claim 19, wherein the instructions further cause the processor to:
responsive to an update request, compare a version of the created PLM system module to a version of the linked module of the SCM system by accessing the breadcrumb; and
if the module of the SCM system is a newer version, updating the PLM system module to the newer version of the module of the SCM system.

* * * * *